United States Patent
Li et al.

(10) Patent No.: US 10,316,651 B2
(45) Date of Patent: Jun. 11, 2019

(54) SYSTEM AND METHOD FOR OILFIELD MANAGEMENT

(71) Applicant: Xinhua Li, Dongying, Shandong (CN)

(72) Inventors: Xinhua Li, Dongying (CN); Haifeng Tian, Dongying (CN); Binghui Li, Dongying (CN)

(73) Assignee: Xinhua Li, Dongying, Shandong (CN)

( * ) Notice: Subject to any disclaimer, the term of this patent is extended or adjusted under 35 U.S.C. 154(b) by 493 days.

(21) Appl. No.: 14/559,231

(22) Filed: Dec. 3, 2014

(65) Prior Publication Data

US 2015/0233235 A1    Aug. 20, 2015

(30) Foreign Application Priority Data

Feb. 20, 2014    (CN) .......................... 2014 1 0058345

(51) Int. Cl.
*E21B 47/12*    (2012.01)
*G06Q 10/06*    (2012.01)
(Continued)

(52) U.S. Cl.
CPC ........... *E21B 47/122* (2013.01); *G06Q 10/06* (2013.01); *G06Q 10/08* (2013.01); *G06Q 50/02* (2013.01); *Y02P 80/114* (2015.11); *Y02P 80/40* (2015.11)

(58) Field of Classification Search
None
See application file for complete search history.

(56) References Cited

U.S. PATENT DOCUMENTS

| 2009/0055029 A1* | 2/2009 | Roberson | E21B 47/00 700/282 |
| 2009/0299654 A1* | 12/2009 | Garvey | E21B 41/00 702/34 |

(Continued)

FOREIGN PATENT DOCUMENTS

| CN | 202900232 U | 4/2013 |
| CN | 202970689 U | 6/2013 |

OTHER PUBLICATIONS

LiYingWei "Design of remote on-line monitoring system for oil-well based on GPRS" Aug. 15, 2005, 54 pages.

*Primary Examiner* — James G Norman
(74) *Attorney, Agent, or Firm* — Brundidge & Stanger, P.C.

(57) ABSTRACT

The present invention relates to an oilfield management system. The oilfield management system comprises: one or more devices for measuring working conditions of oil wells, the one or more devices for measuring working conditions of oil wells are installed on one or more oil wells respectively for measuring working conditions of the one or more oil wells, the working conditions of oil wells at least comprise indicator diagrams of oil wells; one or more remote transmission units, each of the remote transmission units receives the working conditions measured by one or more of the devices for measuring working conditions of oil wells; and server, which determines running status of the one or more oil wells according to the working conditions of oil wells from the one or more remote transmission units; maintenance staff or administrators manage the one or more oil wells according to the running status of the one or more oil wells. The present invention can collect indicator diagrams of an oil well on a regular basis, detect ON/OFF status of an oil well in real time, and realize the calculation of liquid production capacity via indicator diagrams and effi- (Continued)

cient and elaborate management of working conditions of oil wells.

9 Claims, 11 Drawing Sheets

(51) Int. Cl.
*G06Q 10/08* (2012.01)
*G06Q 50/02* (2012.01)

(56) References Cited

U.S. PATENT DOCUMENTS

| | | | |
|---|---|---|---|
| 2013/0030721 A1* | 1/2013 | Palka | F04B 47/026 |
| | | | 702/41 |
| 2013/0127390 A1* | 5/2013 | DaCunha | H02P 5/74 |
| | | | 318/490 |
| 2015/0233235 A1* | 8/2015 | Li | E21B 47/122 |
| | | | 702/6 |

* cited by examiner

SYSTEM AND METHOD FOR OILFIELD MANAGEMENT

TECHNICAL FIELD

The present invention relates to the field of crude oil extraction, and in particular to a system and method for oilfield management.

BACKGROUND ART

Currently, petroleum remains the most important resource. Many oil reservoirs have complicated geologic conditions and thus are very difficult to exploit. It is also very difficult to manage those oilfields. In particular, when it comes to the middle to late stage of its exploitation, conflict between its production and management cost becomes increasingly notable. In order to ensure stable production of oil wells, it is often required that workers go to the field on a regular basis to inspect and maintain oil wells, which causes shortage in staff on the production field and increases production costs of the oilfield. Especially when emergencies happen to some oil wells, the existing way of oilfield management can not spot those emergencies in a timely manner, which might have adverse effect on the production efficiency and waste resources. Therefore, there is a need in the art for an oilfield management system capable of realizing effective management of oilfields.

BRIEF SUMMARY

For problems existing in prior art, the present invention provides an oilfield management system, wherein the oilfield management system comprises: one or more devices for measuring working conditions of oil wells, the one or more devices for measuring working conditions of oil wells are mounted on one or more oil wells respectively for measuring working conditions of oil wells, the working conditions of oil wells at least comprise indicator diagrams of an oil well; one or more remote transmission units, each of the remote transmission units receives the working conditions of oil wells measured by one or more of the devices for measuring working conditions of oil wells; and server, which determines running status of the one or more oil wells according to the working conditions of oil wells from the one or more remote transmission units, and maintenance staff or administrators manage the one or more oil wells according to the running status of the one or more oil wells.

The oilfield management system as described above, wherein the one or more devices for measuring working conditions of oil wells detect ON/OFF status of oil wells, and transmit the measured ON/OFF body to a remote transmission unit.

The oilfield management system as described above, wherein the remote transmission unit comprises: first wireless transmission module, which communicates with the one or more devices for measuring working conditions of oil wells; wherein the remote transmission unit transmits the working conditions of oil wells received from the one or more devices for measuring working conditions of oil wells to maintenance staff or administrators via wired or wireless means.

The one or more oilfield management system as described above, wherein the oilfield management system further comprises wireless base station, and the remote transmission unit further comprises second wireless transmission module, the remote transmission unit communicates with the wireless base station via the second wireless transmission module and transmits the working conditions of oil wells to the wireless base station, the wireless base station transmits the working conditions of oil wells received from the one or more remote transmission units to the server, maintenance staff or administrators via wired or wireless means.

The one or more oilfield management system as described above, wherein the server determines running status of the one or more oil wells according to historical indicator diagrams and/or standard indicator diagrams of the one or more oil wells, and produces corresponding alarm and/or maintenance suggestion.

The one or more oilfield management system as described above, wherein the server further elevates the alarm level and/or informs administrators when the alarm and/or maintenance suggestion are not handled in a timely manner.

The one or more oilfield management system as described above, wherein the server predicts components where malfunction might occur on some oil well within the one or more oil wells and predicts the time when the malfunction occurs; or the server determines possible causes of the malfunction on some oil well within the one or more oil wells, and determines the time when the malfunction occurs.

The one or more oilfield management system as described above further comprise one or more remote control units, the one or more remote control units are mounted on the one or more oil wells, the remote control unit comprises third wireless communication module and control module, the third wireless communication module receives admin command from the server or administrators; the control module executes the admin command.

The one or more oilfield management system as described above, wherein the device for measuring working conditions of oil wells comprises device for collecting indicator diagrams of oil wells and signal transmitter, wherein, the device for collecting indicator diagrams of oil wells comprises: displacement collection unit, which collects displacement data; load collection unit, which collect load data; fourth wireless transmission module which communicates with the remote transmission unit; and fifth wireless transmission module, which communicates with the signal transmitter, wherein the signal transmitter comprises: position detection module, which detects the starting position and/or ending position in each period of indicator diagrams; and sixth wireless transmission module, which transmits signals to the device for collecting indicator diagrams of oil wells according to the starting position and/or ending position in each period of indicator diagrams detected by the position detection module.

The one or more oilfield management system as described above, wherein the position detection module comprises Hall sensor.

The one or more oilfield management system as described above, wherein for walking beam type pumping unit, the position detection module or the Hall sensor is mounted on the bottom of the walking beam to detect the magnet mounted on the walking beam.

The one or more oil field management system as described above, wherein for vertical pumping unit, the position detection module or the Hall sensor is mounted on the support to detect the magnet mounted on the belt.

The one or more oilfield management system as described above further comprises portable oil well maintenance device, which comprises: seventh wireless module, which communicates with the device for measuring indicator diagrams of oil wells and/or the signal transmitter; and calibration module which calibrates the device for measuring indicator diagrams of oil wells and/or the signal transmitter.

According to another aspect of the present invention, there is provided an oilfield management method, the oilfield comprises one or more oil wells, one or more devices for measuring working conditions of oil wells mounted on the one or more oil wells respectively, the method comprises the following steps: measuring working conditions of the one or more oil wells, the working conditions of oil wells at least comprise indicator diagrams of oil wells; receiving the measured one or more working conditions of oil wells via wireless means and forwarding the same to the server; determining running status of the one or more oil wells according to the working conditions of oil wells from the one or more remote transmission units; and maintenance staff or administrators manage the one or more oil wells according to the running status of the one or more oil wells.

The oilfield management method as described above further comprises: transmitting the received working conditions of oil wells to maintenance staff or administrators via wired or wireless means.

The one or more oilfield management method as described above further comprises: detecting ON/OFF status of oil wells, and transmitting the detected ON/OFF body to remote transmission unit.

The one or more oilfield management method as described above further comprises: transmitting the received working conditions of oil wells to wireless base station; and the wireless base station transmits the working conditions of oil wells to server, maintenance staff or administrators via wired or wireless means.

The one or more oilfield management method as described above further comprises determining running status of the one or more oil wells according to historical indicator diagrams and/or standard indicator diagrams of the one or more oil wells and producing corresponding alarm and/or maintenance suggestions.

The one or more oilfield management method as described above further comprises elevating the alarm level and/or informing administrators when the alarm and/or maintenance suggestion are not handled in a timely manner.

The one or more oilfield management method as described above further comprises predicting components where malfunction might occur on some oil well within the one or more oil wells, and predicting the time when the malfunction occurs; or determining possible causes for the malfunction on some oil well within the one or more oil wells, and determining the time when the malfunction occurs.

The one or more oilfield management method as described above further comprises executing admin command from the server or administrators.

The one or more oilfield management method as described above, wherein the measurement of working conditions of the one or more oil wells comprises the measurement of indicator diagrams of the one or more oil wells, which further comprises: detecting the starting position and/or ending position in each period of indicator diagrams, and sending signals; starting the measurement of indicator diagrams of oil wells according to the signals; and collecting displacement data and load data.

The one or more oilfield management method as described above, wherein detecting the starting position and/or ending position in each period of indicator diagrams based on Hall sensor.

The one or more oilfield management method as described above, wherein for walking beam type pumping unit, the Hall sensor is mounted on the bottom of the walking beam to detect the magnet mounted on the walking beam.

The one or more oilfield management method as described above, wherein for vertical pumping unit, the Hall sensor is mounted on the support to detect the magnet mounted on the belt.

The one or more oilfield management method as described above further comprises calibrating the device for measuring indicator diagrams of oil wells and/or device for sending the signals by using portable oil well maintenance device via wireless means.

According to another aspect of the present invention, there is provided an oilfield management system, comprising: one or more devices for measuring indicator diagrams of oil wells, which are mounted between wireline hanger and square clamp of one or more oil wells respectively; one or more signal transmitters, which are mounted on the one or more oil wells respectively; one or more remote transmission units, each of the remote transmission units receives the indicator diagrams of oil wells measured by one or more of the devices for measuring indicator diagrams of oil wells; and server, which determines running status of the one or more oil wells according to the indicator diagrams of oil wells received by the one or more remote transmission units; wherein responding to the starting position and/ending position of each period of indicator diagrams, the one or more signal transmitters transmit signals to the corresponding devices for measuring indicator diagrams of oil wells, the corresponding devices for measuring indicator diagrams of oil wells start the measurement of indicator diagrams of oil wells.

The present invention may collect indicator diagrams of oil wells on a regular basis, detect ON/OFF status of oil wells in real time, and realize the calculation of liquid production capacity via indicator diagrams and efficient and elaborate management of working conditions of oil wells.

DESCRIPTION OF DRAWINGS

The following is a further detailed description of the preferred embodiments of the present invention, taken in conjunction with the accompanying drawings, wherein.

EMBODIMENTS

Figure 1:
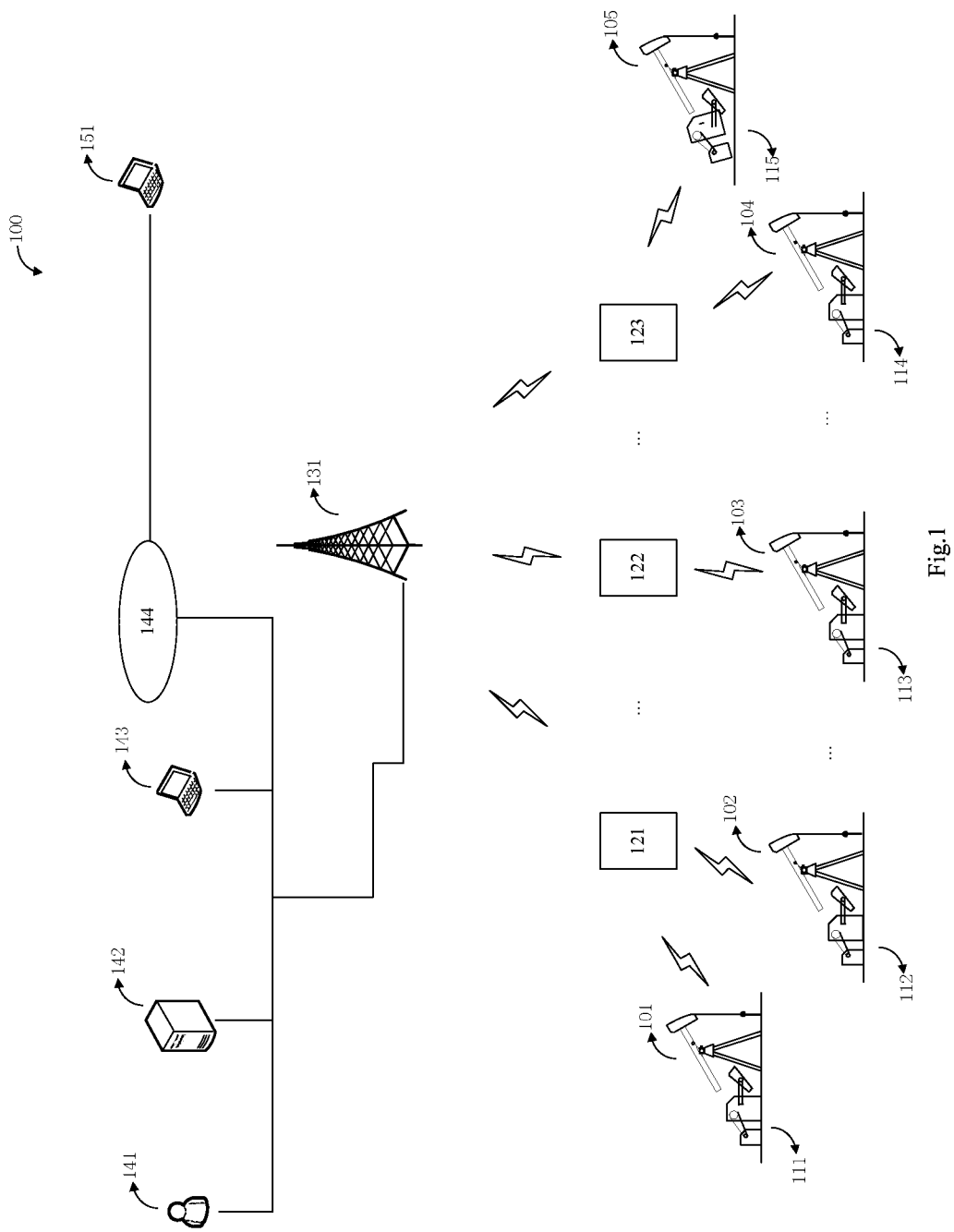
FIG. 1 is a structural schematic illustrating an oilfield management system according to one embodiment of the present invention.

In order to give a clearer picture of the purposes, technical solutions and advantages of the embodiments of the present invention, the following is an explicit and comprehensive description of the technical solutions in the embodiments of the present invention, taken in conjunction with the accompanying drawings in embodiments of the present invention. Apparently, the described embodiments are a part of the embodiments of the present invention, not all of the embodiments. On the basis of the embodiments in the present invention, all other embodiments achieved by persons skilled in the art without paying any creative effort shall fall within the protection scope of the present invention.

In the following detailed description, reference is made to the accompanying drawings, which form a part of the present application and are used to illustrate particular embodiments of the present application. In the drawings, similar symbols in different drawings refer to substantially similar components. Each particular embodiment of the present application is sufficiently described below such that ordinary people having related knowledge and technology in the art are able to implement the technical solutions of the present application. It should be understood that other embodiments can be used or changes can be made to the structure, logical or electrical property of the embodiments of the present application.

According to one embodiment of the present invention, there is provided an oilfield management system. Through the oilfield management system and other assisting devices, accurate measurement of indicator diagrams of an individual well, remote transmission of the indicator diagrams, calculation of liquid production capacity based on the indicator diagrams and analysis in real time, and producing alarm in real time and monitoring the settlement of alarm are possibly achieved, as an elaborate management of the oil fields.

FIG. 1 is a structural schematic illustrating an oilfield management system according to one embodiment of the present invention. As shown in FIG. 1, the oilfield management system 100 comprises devices for measuring working conditions of oil wells. Devices 101-105 for measuring working conditions of oil wells are installed on the one or more oil wells 111-115 respectively. The device for measuring working conditions of oil wells measures one or more parameters reflecting the working conditions of oil wells, such as indicator diagrams, temperature, pressure and so on. Fluid production capacity of oil wells can be calculated via indicator diagrams, and the device for measuring working conditions of oil wells can obtain data of oil well metering device. Production of oil wells can further be calculated through the data obtained by metering device.

Devices for measuring indicator diagrams and/or other devices for measuring parameters of oil wells existing in the prior art can be examples of the devices for measuring working conditions of oil wells. According to one embodiment of the present invention, device for measuring working conditions of oil wells at least measures the indicator diagrams of oil wells. The frequency at which the device for measuring working conditions of oil wells measures indicator diagrams is 4 times a day, 8 times a day, 16 times a day, 24 times a day, or 48 times a day, or even more times a day.

According to one embodiment of the present invention, the oilfield management system 100 comprises one or more remote transmission units (RTU). The one or more RTU can be mounted on or near one or more oil wells. The device for measuring working conditions of oil wells comprises wireless transmission module so as to communicate with RTU. Likewise, RTU also comprises wireless transmission module so as to communicate with device for measuring working conditions of oil wells. According to one embodiment of the present invention, one RTU can support multiple devices for measuring working conditions of oil wells. As shown in FIG. 1, the devices 101 and 102 for measuring working conditions of oil wells mounted on oil wells 111 and 112 respectively communicate with RTU 121; the device 103 for measuring working conditions of oil wells mounted on oil well 113 communicates with RTU 122; the devices 104 and 105 for measuring working conditions of oil wells mounted on oil wells 114 and 115 communicate with RTU 123. Device for measuring working conditions of oil wells communicates with RTU in accordance with any feasible remote communication protocol, such as Zigbee, Z-Wave, ANT, Enocean and the like.

According to one embodiment of the present invention, each of devices 101-105 for measuring working conditions of oil wells support wireless self-organizing protocol, such as Ad-hoc protocol. Each of the devices for measuring working conditions of oil wells can communicate with each other to form a network, wherein each of the devices for measuring working conditions of oil wells in communication with other devices for measuring working conditions of oil wells can be regarded as a RTU. Therefore, it still falls within the scope of the claims of the present invention.

According to one embodiment of the present invention, oilfield management system 100 may comprises a wireless base station. RTU comprises at least two wireless transmission modules, wherein a first wireless transmission module communicates with device for measuring working conditions of oil wells; while a second wireless transmission module communicates with the wireless base station. As shown in FIG. 1, RTU 121-123 communicate with the wireless base station 131. According to one embodiment of the present invention, the wireless base station may be a specific base station specifically configured for oilfield management system, and may also be base stations used for public communication or other purposes. RTU communicates with the wireless base station in accordance with the protocol that the wireless base station supports, such as GSM, GPRS, CDMA2000, LTE and the like. According to one embodiment of the present invention, the wireless base station is optional. Each RTU can be directly connected to maintenance staff, a server, an administrator or internet without through a wireless base station. The addition of the wireless base station largely expands the scope of oilfield management system and reduces costs for networking.

According to one embodiment of the present invention, as shown in FIG. 1, the wireless base station 131 is connected to maintenance staff 141, server 142, administrator 143 or internet 144 via wired or wireless means. Meanwhile, the wireless base station 131 may also be connected to administrator 151 through internet 144 and thus realizing the transmission of administration information and the delivery of administration command.

According to one embodiment of the present invention, the device for measuring working conditions of oil wells transmits indicator diagrams of oil wells to a server via RTU (and wireless base station). The server stores indicator diagrams of each oil well at different time. Maintenance staff or administrators can view the indicator diagrams of each oil well in the server directly or via the internet. According to the indicator diagrams of each oil well, one can determine whether the working status of an oil well is normal, and further obtain liquid production capacity, the maximum and minimum load and other parameters of other working conditions. Further, the server may determines the current working condition of each oil well according to historical data of indicator diagrams of each oil well or standard indicator diagram of each oil well. If emergency happens to a certain oil well, the server produces an alarm and transmits the alarm to the server, maintenance staff or administrators. Further, the server may monitor whether the alarm is handled in timely manner. If the alarm is not handled, for example in one day or two, the server may further elevate the alarm level and inform the administrator via other means (e.g., SMS or phone), or transmits the alarm to other administrators (e.g. a higher level).

Further, if working condition of an oil well changes according to the indicator diagrams of the oil well, but it does not meet the requirement for producing an alarm, the server can produce suggestion for adjusting working condition of the oil well according to changes of the indicator diagrams of the oil well, and set different levels according to different suggestions. Similarly, the server may also monitor whether the suggestion is handled in a timely manner.

Even further, according to changes of indicator diagrams of an oil well, the server may predict which components of the oil well are in a deteriorated stage and might malfunction, and further predict the time when the malfunction occurs. According to those predictions, the server may produce suggestion for changing components of the oil well. Administrators can prepare the components for the replacement in advance, and replace components under poor conditions in the premise of reasonable arrangement of work, prevent occurrence of malfunction and reduce stop time of oil wells.

Even further, a remote control unit is mounted on an oil well. The remote control unit comprises wireless communication module and control module (e.g. one or more relays). Through the wireless communication module, the remote control unit communicates with the server via RTU (and wireless base station). The remote control unit receives admin command from the server or administrators via the wireless communication module, and operate control module according to the admin command and thus realizing remote control of operations of oil wells, such as the control of ON and OFF of an oil well, control of stroke times, control of the use of standby equipment and the like.

According to one embodiment of the present invention, the device for measuring working conditions of an oil well can also receives admin command from the server or the administrators, and finish the setting of its own parameters, or measurement of working conditions according to the admin command.

It should be understood by persons skilled in the art that although only five oil wells 101-105 and three corresponding remote transmission units RTU 111-113 are shown in FIG. 1, the number of oil wells under administration in the embodiments of the present invention is not limited to 3, and it can be 1, 2, 3 to dozens. According to one embodiment of the present invention, one RTU may manage 5 to 12 oil wells, and one wireless base station may support several to thousands of RTU or even more. The number is only limited to the maximum number that the communication protocol it adopts is capable of supporting.

Figure 2:
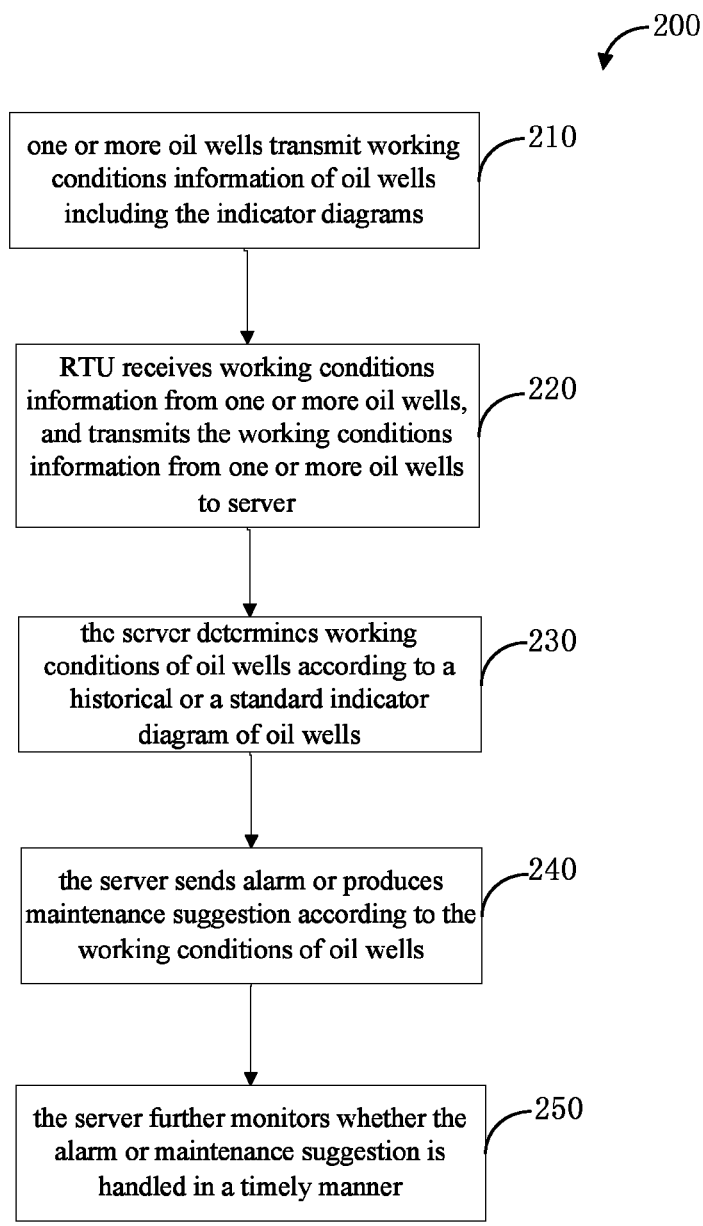
FIG. 2 is a flow chart illustrating an oilfield management method according to one embodiment of the present invention.

FIG. 2 is a flow chart illustrating the method for oilfield management according to one embodiment of the present invention. The method illustrated in FIG. 2 can be applied in the oilfield management system as shown in FIG. 1. As shown in FIG. 2, the method for oilfield management 200 comprises that in step 210 one or more oil wells transmit working conditions information of oil wells including the indicator diagrams. According to one embodiment of the present invention, oil wells are provided with devices for measuring working conditions of oil wells. The devices for measuring working conditions of oil wells can be used for measuring indicator diagrams of oil wells, and transmitting the indicator diagrams via wireless means. There already exits in the prior art devices mounted on oil wells for measuring indicator diagrams of oil wells. The devices for measuring working conditions of oil wells may comprise such devices to measuring indicator diagrams of oil wells. Further, the device for measuring working conditions of an oil well may comprise wireless module used for transmitting working conditions information including indicator diagrams via wireless means. Further, working conditions information may also comprise temperature, pressure and other parameters of oil wells.

In step 220, RTU receives working conditions information from one or more oil wells, and transmits the working conditions information from one or more oil wells to server. In step 230, the server determines working conditions of oil wells according to a historical or a standard indicator diagram of oil wells. In step 240, the server sends alarm or produces maintenance suggestion according to the working conditions of oil wells. In step 250, the server further monitors whether the alarm or maintenance suggestion is handled in a timely manner.

According to one embodiment of the present invention, the indicator diagram of a certain oil well suddenly changes from a shape similar to parallelogram to a flat shape and its area becomes very small. The server determines that "break-out" of sucker rod happens to the oil well, and sends out alarm immediately. Administrators spot the malfunction where sucker rod "breaks out" at the very first time through the alarm in the server and finish the replacement of sucker rod.

According to another embodiment of the present invention, the area of the indicator diagram of a certain oil well suddenly becomes small. The server can not determine the specific malfunction occurring to the oil well, but sends out alarm of "suddenly change in area of indicator diagram". The administrators immediately go out for maintenance and spot "wax deposition pump leakage" on site. The administrators perform "well washing" in a timely manner and restore the working of the oil well.

According to another embodiment of the present invention, the indicator diagram of a certain oil well within a period of time has fine strips on the right side and the area of the entire indicator diagram is small. The server determines according to the indicator diagram that oil supply might be insufficient. The server produces a maintenance suggestion for adjusting stroke times. The administrators remotely send out admin command for adjusting stroke times to remote control unit mounted on the oil well. The remote control unit changes the stroke times of the oil well. After several times of adjusting stroke times, the indicator diagram is found not to have any obvious changes. The administrators set a lower value of stroke times of the oil well via the remote control unit to reduce energy consumption.

Through the above embodiment, one can see that the transmission of indicator diagram of each oil well through RTU via wireless means to the server can realize centralized monitoring and maintenance of working conditions of oil wells and thus achieving effect management of oilfield.

Figure 3:
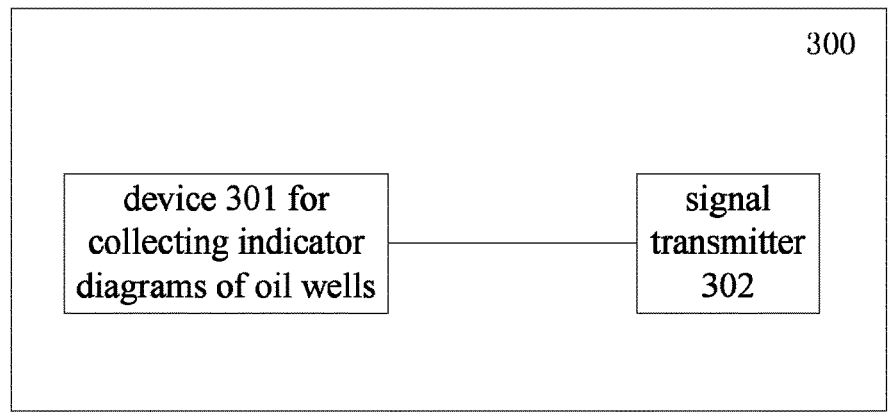
FIG. 3 is a schematic illustrating a device for measuring working conditions of oil wells according to one embodiment of the present invention.

FIG. 3 is a schematic illustrating device for measuring working conditions of an oil well according to one embodiment of the present invention. As shown in FIG. 3, the device for measuring working conditions of an oil field 300 comprises device 301 for collecting indicator diagrams of oil wells and signal transmitter 302.

Figure 4:
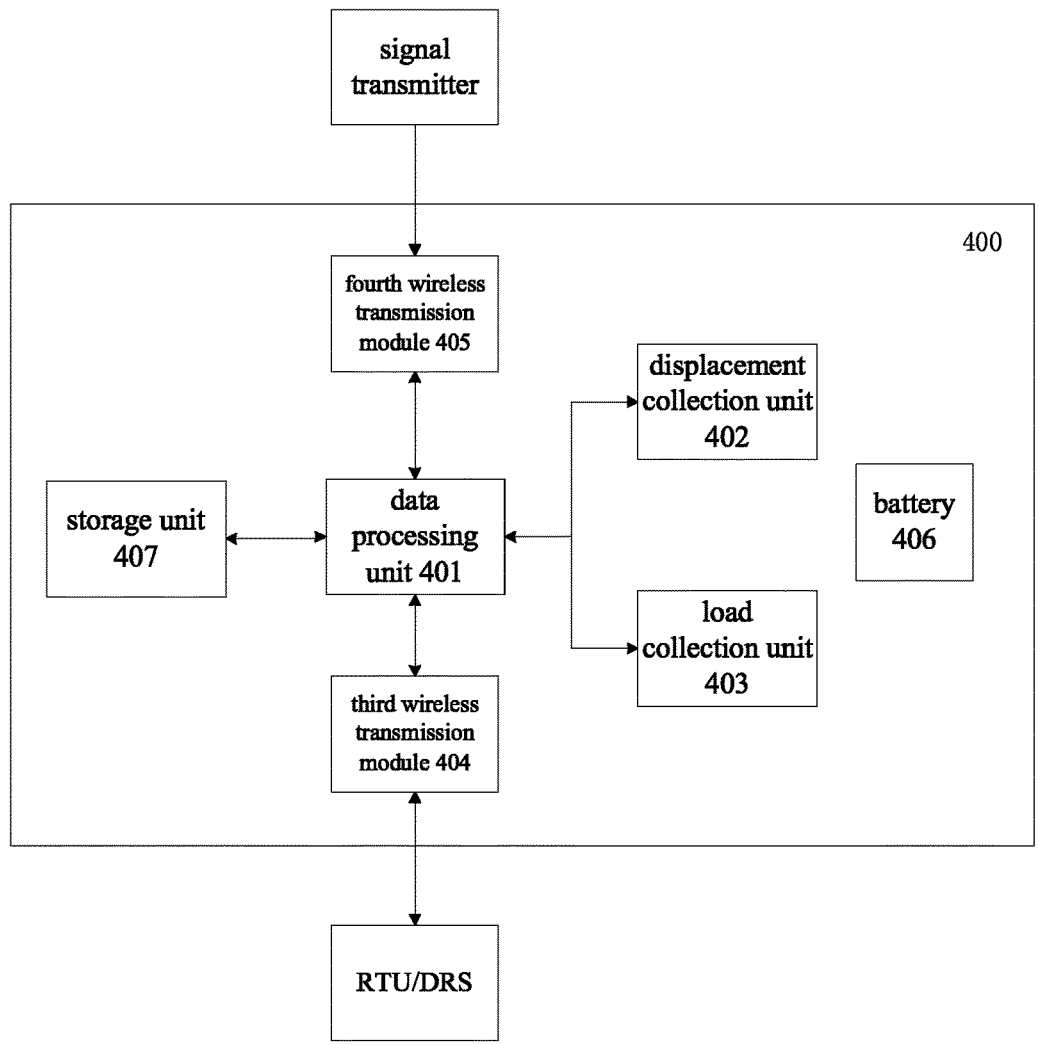
FIG. 4 is a structural schematic illustrating a device for collecting indicator diagrams of oil wells according to one embodiment of the present invention.

FIG. 4 is a structural schematic illustrating a device for collecting indicator diagrams of oil wells according to one embodiment of the present invention. According to one embodiment of the present invention, the device 400 for collecting indicator diagrams of oil wells comprises: a data processing unit 401, a displacement collection unit 402, a load collection unit 403, a third wireless transmission module 404 and a fourth wireless transmission module 405. Wherein, the displacement collection 402 is connected to the date processing unit 401 to collect displacement data. The load collection unit 403 is connected to the data processing unit 401. The third wireless transmission module 404 is connected to the data processing unit 401. The third wireless transmission module 404 communicates with RTU or Data Relay Station (DRS) to transmit working conditions data including indicator diagrams or receive admin command from RTU or DRS. The fourth wireless transmission module 405 is connected to the data processing unit 401. The fourth wireless transmission module 405 communicates with the signal transmitter for receiving signal of the starting position from the signal transmitter. According to one embodiment of the present invention, the first and second wireless transmission modules can be the same module using the same communication protocol. As shown in FIG. 4, the device for measuring working conditions of an oil well further comprises battery 406 and storage unit 407. One example of the data processing unit 401 is single-chip microcomputer.

According to one embodiment of the present invention, the device for collecting indicator diagrams of an oil well is mounted between the wireline hanger and the square clamp of an oil well. It should be understood by persons skilled in the art that the device for collecting indicator diagrams of an oil well may also be mounted at other positions of an oil well that can realize the measurement of indicator diagrams.

According to one embodiment of the present invention, the displacement collection unit 402 comprises Hall sensor circuit board and displacement line. Wherein, the Hall sensor circuit board and displacement line are mounted in a displacement mechanism. According to characteristics of Hall electric components, when a displacement line is dragged out, the data processing unit can precisely calculate the lengthen of the displacement line dragged out through the detection function of Hall components in the Hall sensor electric circuit board. When the displacement line draws back, the data processing unit can precisely calculate the length of the displacement line drawn back according to the detection function of Hall components in the Hall sensor electric circuit board. Through the high sensitivity of the Hall electric components, the accuracy of the measurement of displacement can be improved.

According to one embodiment of the present invention, the load collection unit 403 comprises resistive bridge and operational amplifier. Wherein, the resistive bridge is connected to strain material to monitor changes of load. The strain material can change its electronic resistance in response to different loads applied to the strain material. And, the changes of load can be then transformed into change of voltage via the resistive bridge. The input end of the operational amplifier is connected to the resistive bridge to amplify the voltage value transformed by the resistive bridge. The data processing unit is connected to the output end of the operational amplifier to calculate the load value of an oil well. This is an example of measurement of the load. Other existing method for collecting the loads can also be used in the load collection unit 403 as indicated in the above.

Another important aspect of the measurement of indicator diagrams is to determine the position of the starting point. If the position of the starting point is correct, the indicator diagrams resulting from the measurement may precisely reflect working status of an oil well. However, it is difficult to determine the starting point of each stroke at the position where the device for collecting indicator diagrams of an oil well is mounted. Therefore, the embodiment illustrated in FIG. 4 chooses to receive starting and/or ending signals from an outside signal transmitter, and then determine position of the starting point of an indicator diagram. When each stroke starts and/or ends, the fourth wireless transmission module 405 receives signals from the signal transmitter, and forwards the same to the data processing unit 401. The data processing unit 401 controls the displacement collection unit 402 and the load collection unit 403 to start the measurement of indicator diagrams. The data processing unit 401 stores the measured indicator diagrams in the storage unit 407 or transmits the indicator diagrams outward to RTU, DRS, server, maintenance staff or administrators via the third wireless transmission module 404.

Figure 5:
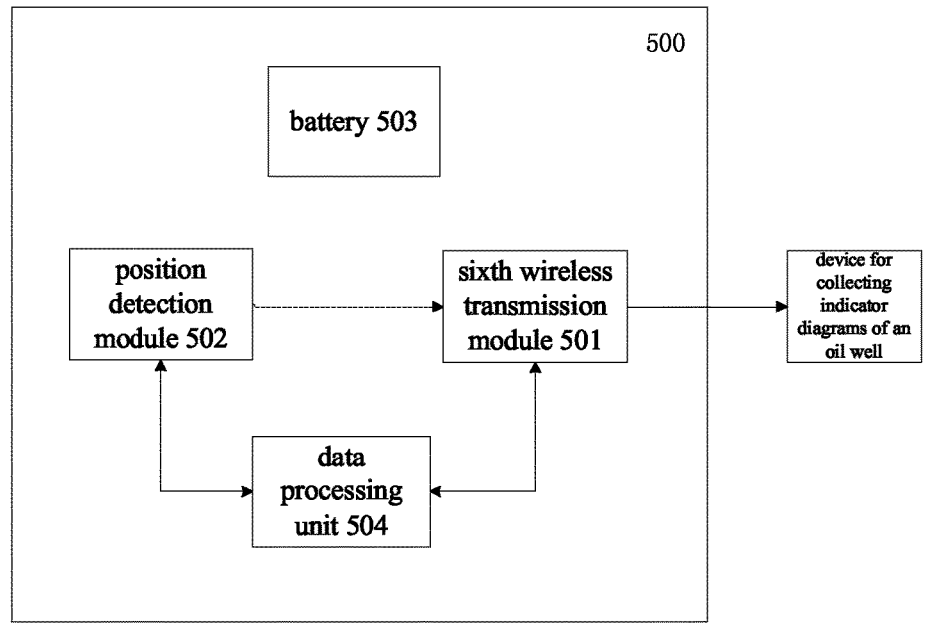
FIG. 5 is a structural schematic illustrating a signal transmitter according to one embodiment of the present invention.

FIG. 5 is a structural schematic illustrating a signal transmitter according to one embodiment of the present invention. As shown in FIG. 5, signal transmitter 500 comprises sixth wireless transmission module 501 and position detection module 502. The position detection module 502 detects starting position and/or ending position in each period, and transmits the information to the data processing unit 504. Under the control of the data processing unit 504, the sixth wireless transmission module 501 transmits the signals of starting position and/or ending position in each period to the device for collecting indicator diagrams of an oil well via wireless means. Signal transmitter 500 comprises battery 503. Alternatively, the signal transmitter 500 comprises data processing unit 504. The data processing unit 504 is connected to the sixth wireless transmission module 501 and the position detection module 502 to receive signals from the position detection module 502 and control the wireless transmission module 501 to transmit signals of starting position and/or ending position in each period to device for collecting indicator diagrams of an oil well via wireless means. According to one embodiment of the present invention, the position detection module 502 may detect starting position and ending position of each period in different manners according to different pumping units. For example, for walking beam type pumping unit, the position detection module may detect angle of the walking beam or measure distance from the walking beam to the beam base by using micro switch.

However, although a variety of measurement methods exist, the inventor surprisingly found that the position detection module based on Hall sensor has excellent performance in adapting to complicated environment and maintenance. The maintenance period of the position detection module based on Hall sensor is ten times to dozens of times of the maintenance period in other ways.

Figure 6A:
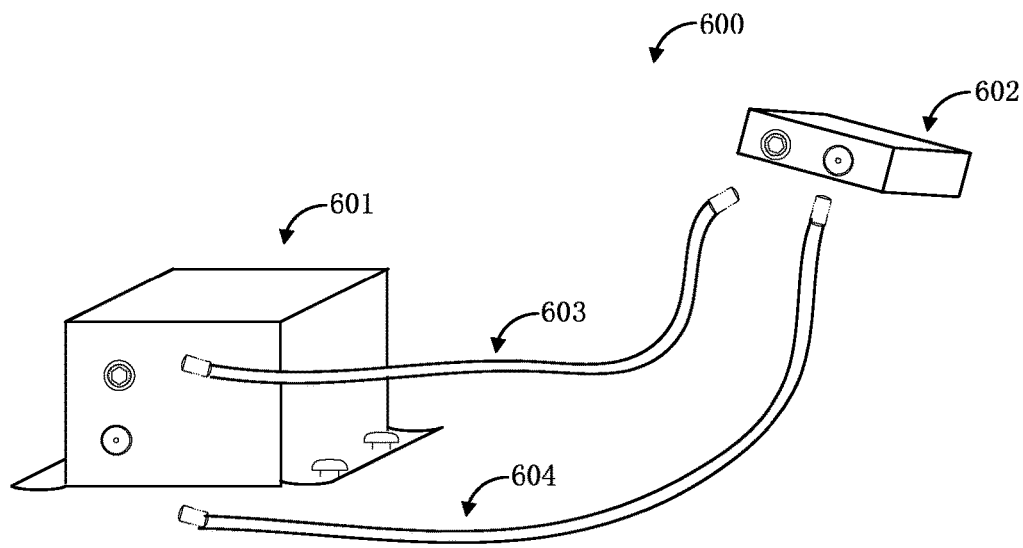
FIG. 6A is a structural schematic illustrating a signal transmitter based on Hall sensor according to one embodiment of the present invention.
Figure 6B:
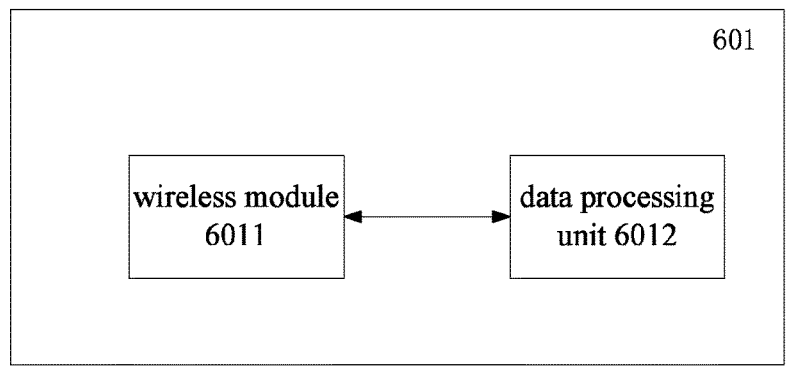
FIG. 6B is a structural schematic illustrating the main body of a signal transmitter base on Hall sensor according to one embodiment of the present invention.

FIG. 6A is a structural schematic illustrating a signal transmitter based on Hall sensor according to one embodiment of the present invention. As shown in FIG. 6A, the signal transmitter 600 comprises a main body part 601 and a Hall sensor part 602. The above two parts are connected via power line 603 and signal line 604. FIG. 6B is a structural schematic illustrating the main body part of a signal transmitter based on the Hall sensor according to one embodiment of the present invention. As shown in FIG. 6B, the main body part 601 comprises a wireless module 6011 and a data processing unit 6012.

Figure 7A:
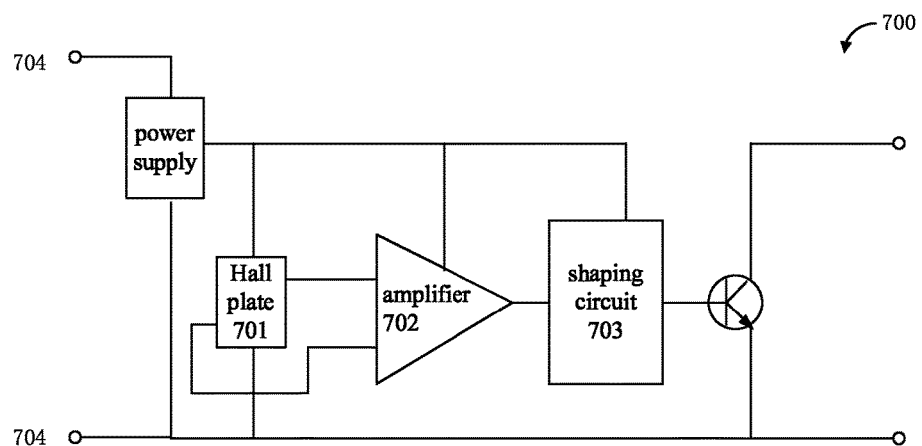
FIG. 7A is a circuit schematic illustrating the Hall sensor part of a position detection module based on Hall sensor according to one embodiment of the present invention.

FIG. 7A is a circuit schematic illustrating the Hall sensor part of a position detection module based on Hall sensor according to one embodiment of the present invention. Persons skilled in the art should understand that the circuit illustrated in FIG. 7 is only for illustration purpose, and not to limit the structure of the Hall sensor part. Hall sensors with other circuit structures are also feasible in this embodiment. The Hall sensor part 700 comprises a Hall plate 701. The Hall plate 701 is connected along two sides of Y axis to two ends of power supply voltage respectively; while the Hall plate is connected as output to the input of amplifier 702 along two ends of X axis. Output of the amplifier 702 forms a square wave after reshaped by shaping circuit 703 and is output via OC output end. The Hall sensor part 700 also comprises a voltage stabilizing circuit 704, which is connected to two ends of the power supply voltage to ensure stability of output voltage and thus ensuring accuracy of measurement result. One example of the shaping circuit 703 is Schmitt trigger. As such, when the magnetic field is closed at the direction of Z axis of Hall plate and the field intensity reaches a certain threshold, a pulse is formed on the amplifier. It changes to an output signal of square wave after being amplified by the amplifier and again reshaped by the shaping circuit.

Figure 7B:
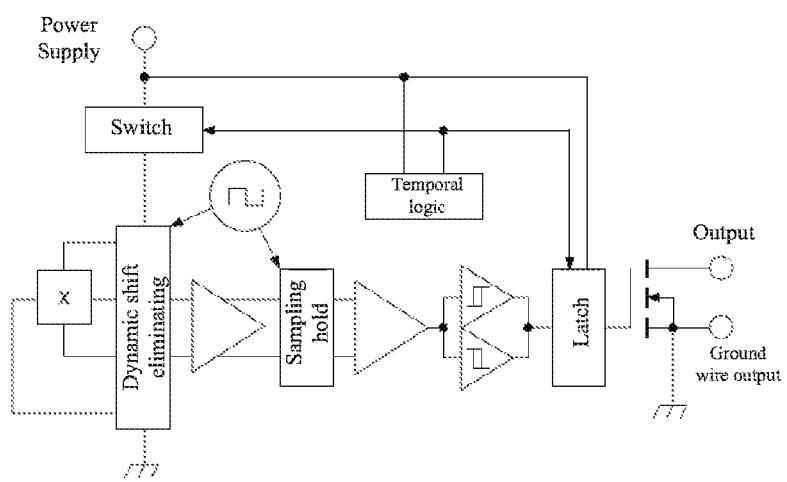
FIG. 7B is a circuit schematic illustrating the Hall sensor part of a position detection module based on Hall sensor according to another embodiment of the present invention.

FIG. 7B is a circuit schematic of the Hall sensor part of a position detection module based on Hall sensor according to another embodiment of the present invention. This circuit diagram is a circuit schematic of the micro-power Hall switch IC A3212 of American Allegro MircoSystem Corporation. It is very convenient to construct the Hall sensor of the present invention based on the A3212 chip.

Figure 8:
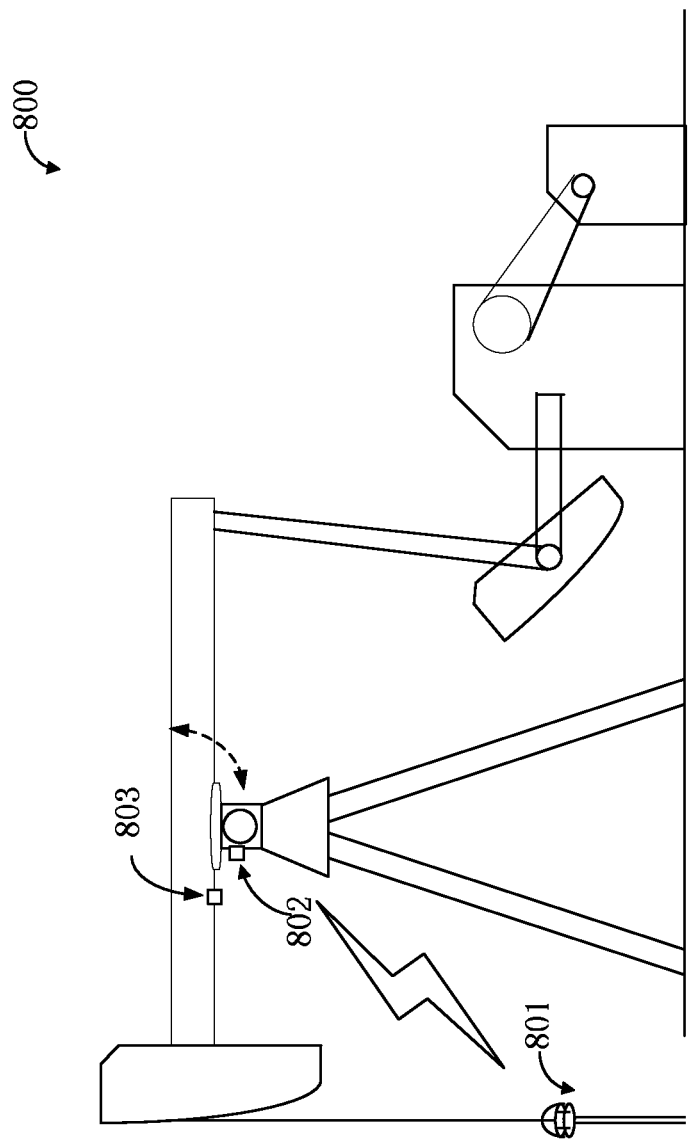
FIG. 8 is a schematic illustrating the use of a device for measuring working conditions of oil wells in walking beam type pumping unit according to one embodiment of the present invention.

FIG. 8 is a schematic illustrating the application of device for measuring working conditions of an oil well according to one embodiment of the present invention in the walking beam type pumping unit. As shown in FIG. 8, the device 800 for measuring working conditions of an oil well comprises a device 801 for collecting indicator diagrams of an oil well, which is mounted between the wireline hanger and the square clamp; and a signal transmitter 802, which is mounted on the bottom of the walking beam (or the Hall sensor part of the signal transmitter 802 is mounted on the bottom of the walking beam). A magnet 803, for example permanent magnet, corresponding to the Hall sensor par of the signal transmitter is provided on the walking beam of the oil well. When the walking beam swings, the magnet 803 closes to or moves away from the Hall sensor part of the signal transmitter. And when the walking beam is at its lowest point, the Hall sensor part of the signal transmitter is configured to be triggered to send out a signal. The wireless part of the signal transmitter 802 receives the signal from the Hall sensor part and transmits the signal to the device for collecting indicator diagrams of an oil well via a wireless link, and initiates the measurement of indicator diagrams of the oil well. After finishing the measurement of indicator diagrams, the device 801 for collecting indicator diagrams of an oil well stores the indicator diagrams, and transmits the same to nearby RTU or DRS 804, and thus realizing the measurement and transmission of indicator diagrams of an oil well.

Figure 9:
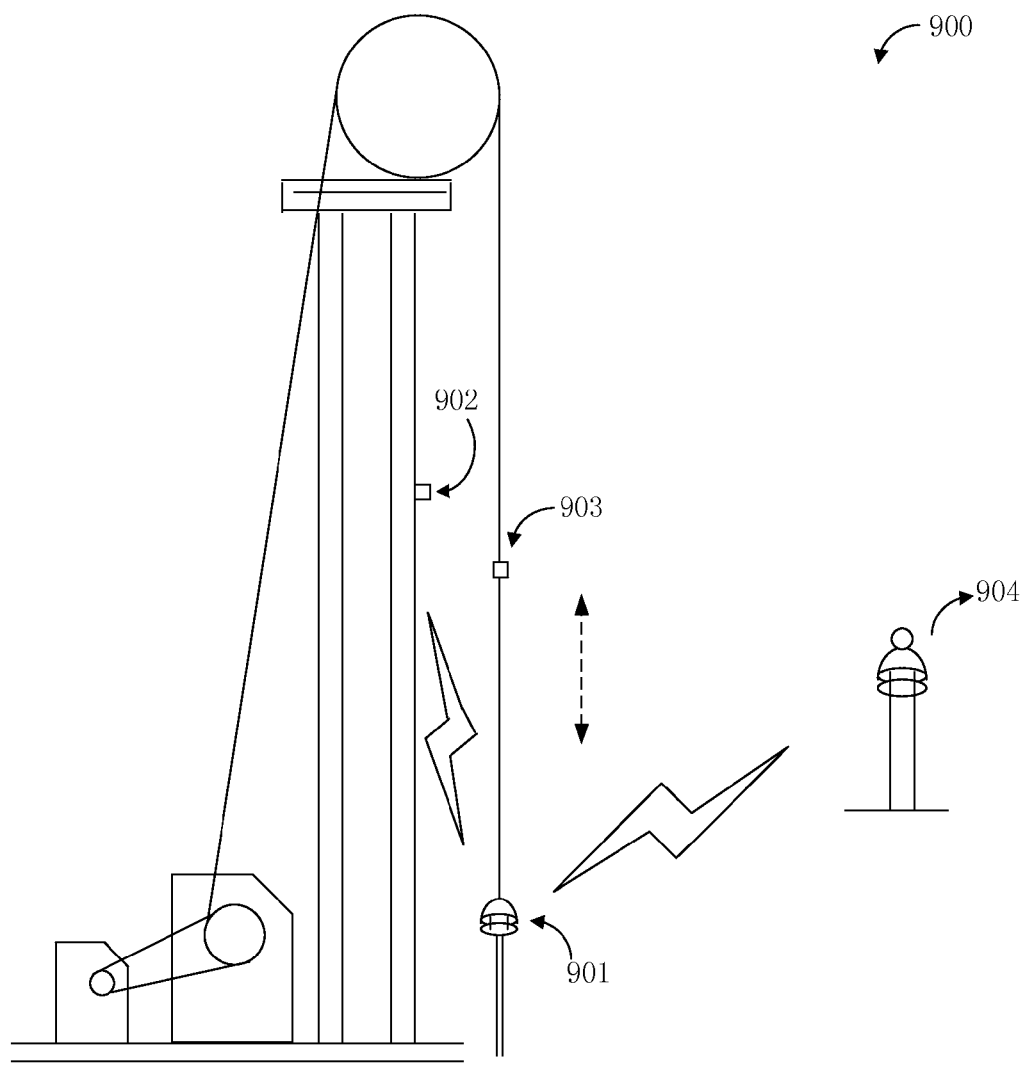
FIG. 9 is a schematic illustrating the use of a device for measuring working conditions of oil wells in vertical pumping unit according to one embodiment of the present invention.

FIG. 9 is a schematic illustrating the use of a device for measuring working conditions of an oil well according to one embodiment of the present invention in the vertical pumping unit. As shown in FIG. 9, the device 900 for measuring working conditions of an oil well comprises a device 901 for collecting indicator diagrams of an oil well, which is mounted between the wireline hanger and the square clamp; and a signal transmitter 902, which is mounted on the side of the support close to the belt (or the Hall sensor part of the signal transmitter 902 mounted on the side of the support close to the belt). A magnet 903, for example a permanent magnet, corresponding to the Hall sensor part of the signal transmitter is mounted on the belt of the oil well. When the belt moves up and down, the magnet 903 closes to or moves away from the Hall sensor part of the signal transmitter. And when the distance between the magnet and the Hall sensor is less than a predefine threshold, the Hall sensor part of the signal transmitter is configured to be triggered to send out a signal. The wireless part of the signal transmitter 902 receives the signal from the Hall sensor part and then transmits the signal to the device 901 for collecting indicator diagrams of an oil well via a wireless link to initiate the measurement of indicator diagrams of the oil well by the device 901 for collecting indicator diagrams of an oil well. After finishing the measurement of the indicator diagrams, the device 901 for collecting indicator diagrams of an oil well stores the indicator diagrams and transmits the same to nearby RTU or DRS 904 and thus realizing the measurement and transmission of indicator diagrams of an oil well.

Figure 10:
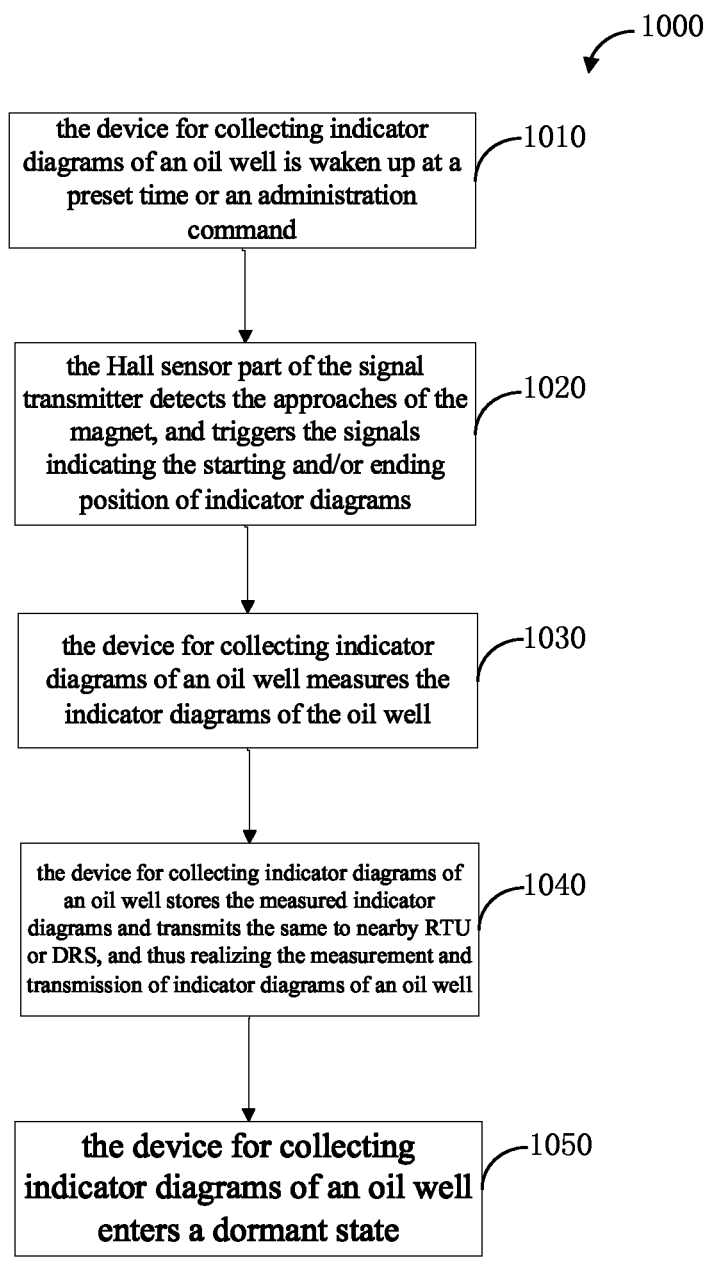
FIG. 10 is a flow chart illustrating the method for measuring indicator diagrams of oil wells according to one embodiment of the present invention.

FIG. 10 is a flow chart illustrating the method for measuring indicator diagrams of an oil well according to one embodiment of the present invention. As shown in 10, the method 1000 for measuring indicator diagrams of an oil well comprises: in step 1010, the device for collecting indicator diagrams of an oil well is waken up at a preset time or an administration command. The device for collecting indicator diagrams of an oil well is usually in a dormant state so as to save power. In step 1020, the Hall sensor part of the signal transmitter detects the approaches of the magnet, and triggers the signals indicating the starting and/or ending position of indicator diagrams. In step 1030, the device for collecting indicator diagrams of an oil well measures the indicator diagrams of the oil well. In step 1040, the device for collecting indicator diagrams of an oil well stores the measured indicator diagrams and transmits the same to nearby RTU or DRS, and thus realizing the measurement and transmission of indicator diagrams of an oil well. In step 1050, the device for collecting indicator diagrams of an oil well enters a dormant state.

Figure 11:
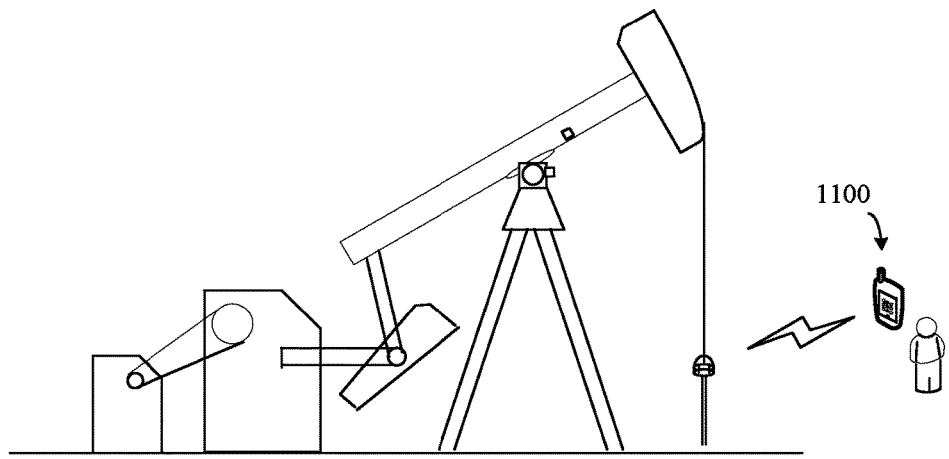
FIG. 11 is a schematic illustrating the use of a portable oil well maintenance device according to one embodiment of the present invention.

FIG. 11 is a schematic illustrating the application of a portable oil well maintenance device according to one embodiment of the present invention. As shown in FIG. 11, the oilfield management system of the present invention also comprises one or more portable oil well maintenance devices 1100 which are distributed to the maintenance staff to help them to maintain oil wells or devices for measuring working conditions of oil wells on site.

Figure 12:
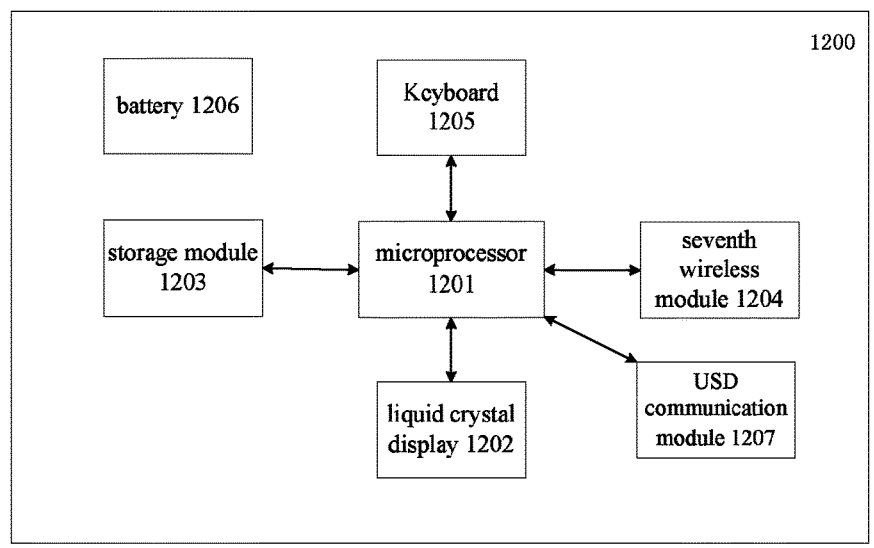
FIG. 12 is a structural schematic illustrating a portal oil well maintenance device according to one embodiment of the present invention.

FIG. 12 is a structural schematic illustrating a portable oil well maintenance device according to one embodiment of the present invention. The portable oil well maintenance device comprises: a microprocessor 1201, a liquid crystal display 1202, a storage module 1203, a seventh wireless module 1204, a keyboard 1205 and a battery 1206. The liquid crystal display 1202 is connected to the microprocessor 1201 for displaying indicator diagrams or finishing corresponding functions; the storage muddle 1203 is connected to the microprocessor 1201 for storing indicator diagrams and corresponding programs and functional data. The seventh wireless module 1204 is connected to the microprocessor 1201 and is capable of communicating with device for measuring indicator diagrams of an oil well and/or signal transmitter to receive indicator diagrams and corresponding settings of the above two and transmit signals for initiating measurement of indicator diagrams and the like. Keyboard 1205 is connected to the microprocessor 1201 for finishing related input. Battery 1206 supplies power to the entire apparatus. Further, the portable oil well maintenance device also comprises USD communication module 1207, which is connected to the microprocessor 1201 for facilitating communication with computer.

The portable oil well maintenance device is compact in structure, easy to operate, large in storage, reliable in working, and is capable of precisely collecting indicator diagrams of an oil well and liquid level information and transmitting the same to the server, the computer and so on, which make operational staff capable of back playing and printing data on computer.

Figure 13:
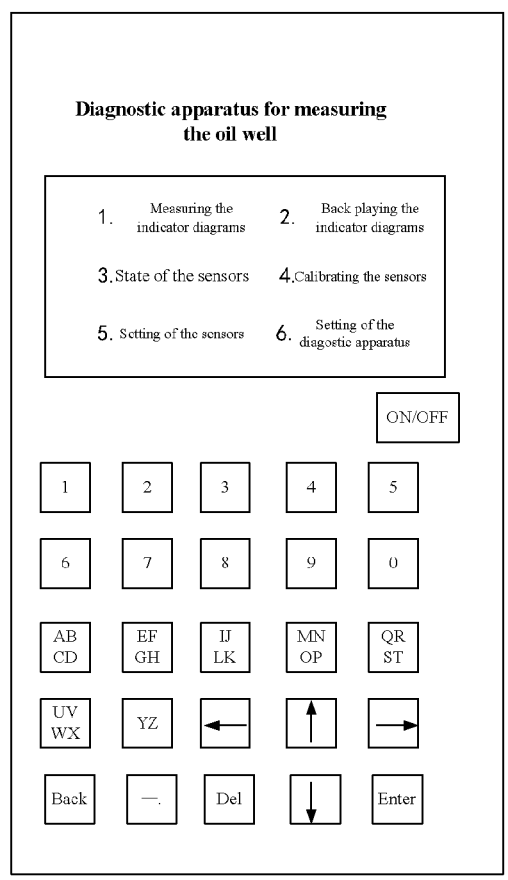
FIG. 13 is a schematic illustrating the panel of a portable oil well maintenance device according to one embodiment of the present invention.

FIG. 13 is a panel schematic illustrating a portable oil well maintenance device according to one embodiment of the present invention. In combination with FIG. 11-FIG. 13, the method for operating the portable oil well maintenance device comprises: first, communicate between the portable oil well maintenance device and the device for measuring indicator diagrams of an oil well and wake up or initiate the device for measuring indicator diagrams of an oil well; second, measure indicator diagrams of displacement and load of an oil well in real time; or download, store, or view the indicator diagrams stored in the device for measuring indicator diagrams of an oil well; third, analyze or determine working status of an oil well according to the indicator diagrams of an oil well, for example calculating area of the indicator diagrams, calculating power of polish rod and the like; and fourth, maintain oil wells on site according to working status of oil wells.

According to one embodiment of the present invention, the portable oil well maintenance device may also view status of the sensors on displacement and load collection modules.

According to one embodiment of the present invention, the portable oil well maintenance device further comprises a calibration module for calibrating the displacement and load collection modules in the device for measuring indicator diagrams of an oil well. It is because that the zero point of the displacement and load collection modules might shift after a certain period of time. The recalibrating of the zero point can be performed by the portable oil well maintenance device. According to one embodiment of the present invention, the calibration module may also be a calibration program running on the microprocessor. Through execution of the calibration program, the calibration of corresponding sensors on the displacement and load collection modules can be finished.

According to one embodiment of the present invention, the portable oil well maintenance device may also calibrate pressure sensor and the like, or change settings of corresponding sensors, pressure sensors and the like on the displacement and load collection devices.

The above embodiments are only used for illustrating the present invention, and not to limit the present invention. Ordinary persons skilled in the related art can make various changes and modifications without departing from the scope of the present invention. Therefore, all equivalent technical solutions shall also belong to the disclosure of the present invention.

We claim:

1. An oilfield management system, comprising:
one or more devices for measuring working condition of an oil well installed on one or more oil wells and configured to respectively measure working conditions of the one or more oil wells, wherein the working conditions of the oil well at least comprise indicator diagram of the oil well; wherein the device for measuring working condition of the oil well comprises device for collecting an indicator diagram of an oil well and a signal transmitter,
wherein, the device for collecting the indicator diagram of the oil well comprises:
a displacement collection unit configured to collect displacement data;
a load collection unit configured to collect load data;
wherein, the signal transmitter comprises:
a position detection module configured to detect starting position and/or ending position in period of indicator diagrams; and
wherein the position detection module comprises a Hall sensor which is mounted on the bottom of the walking beam to detect a magnet mounted on an upper portion of a post and the Hall sensor is outside of magnetic scope of the magnet when the magnet is away from the walking beam or the support;
one or more remote transmission units, each of the remote transmission units being configured to receive the working conditions of the one or more oil wells measured by the one or more of the devices for measuring working condition of the oil well; and
a server configured to determine status of the one or more oil wells according to the working conditions including indicator diagrams of the one or more oil wells received from the one or more remote transmission units, the one or more oil wells being managed according to the status of the one or more oil wells;
wherein the server is configured to determine the status of the one or more oil wells based on comparing the received indicator diagrams with historical indicator diagrams and/or standard indicator diagrams of the one or more oil wells, and produce an alarm and maintenance suggestion; and
wherein the server is further configured to predict a component where malfunction might occur in an oil well within the one or more oil wells and the time when the malfunction occurs, according to changes of indicator diagrams of the one or more oil wells in the comparing result.

2. The oilfield management system according to claim 1, wherein the one or more devices for measuring working condition of the oil well is configured to detect ON/OFF status of an oil well, and transmit the detected ON/OFF status to remote transmission unit.

3. The oilfield management system according to claim 1, wherein the remote transmission unit comprises: a first wireless transmission module configured to communicate with the one or more devices for measuring working condition of the oil well; wherein the remote transmission unit is configured to transmit the working conditions of the oil wells received from the one or more devices for measuring working condition of the oil well to the server, maintenance staff, or administrators via wired or wireless means.

4. The oilfield management system according to claim 3, wherein the oilfield management system further comprises a wireless base station, and the remote transmission unit further comprises a second wireless transmission module, wherein the remote transmission unit is configured to communicate with the wireless base station via the second wireless transmission module, and transmit the working condition of the oil wells to the wireless base station, and the wireless base station is configured to transmit the working condition of the oil well received from the one or more remote transmission units to the server, maintenance staff, or administrators via wired or wireless means.

5. The oilfield management system according to claim 1, wherein the server further elevates alarm level and/or informs administrators when the alarm and/or maintenance suggestion are not handled in a timely manner.

6. The oilfield management system according to claim 1, wherein the server is further configured to determine a possible cause of the malfunction in an oil well within the one or more oil wells, and the time when the malfunction occurs.

7. The oilfield management system according to claim 1, further comprising one or more remote control units installed on the one or more oil wells, wherein the remote control unit comprises a third wireless communication module and a control module, and wherein the third wireless communication module is configured to receive administration command and the control module is configured to execute the administration command.

8. The oilfield management system according to claim 1, further comprising a portable oil well maintenance device, wherein the portable oil well maintenance device comprises:
a seventh wireless module configured to communicate with the device for collecting an indicator diagram of an oil well and/or the signal transmitter; and
a calibration module configured to calibrate the device for collecting an indicator diagram of an oil well and/or the signal transmitter.

9. An oilfield management system comprising:
one or more devices for measuring an indicator diagram of an oil well, which are installed between the wireline hanger and the square clamp of one or more oil wells respectively; wherein the device for measuring working condition of the oil well comprises device for collecting an indicator diagram of an oil well and a signal transmitter,
wherein, the device for collecting the indicator diagram of the oil well comprises:
a displacement collection unit configured to collect displacement data;
a load collection unit configured to collect load data;
wherein, the signal transmitter comprises:
a position detection module configured to detect starting position and/or ending position in period of indicator diagrams; and
wherein the position detection module comprises a Hall sensor which is mounted on the bottom of the walking beam to detect a magnet mounted on an upper portion of a post and the Hall sensor is outside of magnetic scope of the magnet when the magnet is away from the walking beam or the support;
one or more signal transmitters mounted on the one or more oil wells respectively;
one or more remote transmission units, each of the remote transmission units being configured to receive the indicator diagram of an oil well measured by one or more of the devices for measuring indicator diagrams of an oil well; and
a server configured to determine status of the one or more oil wells according to the indicator diagram of an oil well received by the one or more remote transmission units;
wherein the server is configured to determine the status of the one or more oil wells based on comparing the received indicator diagrams with historical indicator diagrams and/or standard indicator diagrams of the one or more oil wells, and produce an alarm and maintenance suggestion;
wherein the server is further configured to predict a component where malfunction might occur in an oil well within the one or more oil wells and the time when the malfunction occurs, according to changes of indicator diagrams of the one or more oil wells in the comparing result; and
wherein responding to starting position and/ending position of each period of the indicator diagram, the one or more signal transmitters transmit a signal to the corresponding device for collecting the indictor diagram of an oil well and enable the corresponding device for collecting indicator diagrams of an oil well to start the measurement of indicator diagrams of an oil well.

* * * * *